United States Patent
Asaoka

(10) Patent No.: US 8,090,509 B2
(45) Date of Patent: Jan. 3, 2012

(54) TRANSMISSION, VEHICLE HAVING THE TRANSMISSION, AND CONTROL DEVICE AND CONTROL METHOD FOR THE TRANSMISSION

(75) Inventor: Ryousuke Asaoka, Shizuoka (JP)

(73) Assignee: Yamaha Hatsudoki Kabushiki Kaisha, Iwata-Shi (JP)

(*) Notice: Subject to any disclaimer, the term of this patent is extended or adjusted under 35 U.S.C. 154(b) by 873 days.

(21) Appl. No.: 12/021,902

(22) Filed: Jan. 29, 2008

(65) Prior Publication Data

US 2008/0183357 A1 Jul. 31, 2008

(30) Foreign Application Priority Data

Jan. 31, 2007 (JP) ................................ 2007-021241

(51) Int. Cl.
*G06F 7/00* (2006.01)

(52) U.S. Cl. ........................................... 701/51; 477/46

(58) Field of Classification Search .................... 701/51, 701/61; 477/46, 68
See application file for complete search history.

(56) References Cited

U.S. PATENT DOCUMENTS

| | | | | | |
|---|---|---|---|---|---|
| 3,604,288 | A | * | 9/1971 | Mori | 477/161 |
| 3,882,740 | A | * | 5/1975 | Forster et al. | 477/161 |
| 5,115,395 | A | * | 5/1992 | Petzold | 701/67 |
| 5,252,905 | A | * | 10/1993 | Wills et al. | 318/807 |
| 5,285,389 | A | * | 2/1994 | Taylor | 701/51 |
| 5,925,087 | A | * | 7/1999 | Ohnishi et al. | 701/70 |
| 6,653,829 | B1 | * | 11/2003 | Henry et al. | 324/207.21 |
| 7,086,496 | B2 | * | 8/2006 | Kodama | 180/446 |
| 7,407,298 | B2 | * | 8/2008 | Onuki et al. | 359/841 |
| 7,511,474 | B2 | * | 3/2009 | Washington | 324/166 |
| 7,633,248 | B1 | * | 12/2009 | Williams | 318/150 |
| 7,746,023 | B2 | * | 6/2010 | Ajima et al. | 318/700 |
| 7,862,459 | B2 | * | 1/2011 | Ishioka | 474/70 |
| 2001/0056320 | A1 | * | 12/2001 | Kato et al. | 701/51 |
| 2002/0183911 | A1 | * | 12/2002 | Tashiro et al. | 701/48 |
| 2003/0021613 | A1 | * | 1/2003 | Koide | 399/167 |
| 2003/0130078 | A1 | * | 7/2003 | Aikawa et al. | 475/116 |
| 2004/0145321 | A1 | * | 7/2004 | Yasui et al. | 318/135 |
| 2004/0204286 | A1 | * | 10/2004 | Stridsberg | 477/14 |
| 2004/0232864 | A1 | * | 11/2004 | Sunaga et al. | 318/434 |
| 2005/0065690 | A1 | * | 3/2005 | Ashizawa et al. | 701/51 |
| 2005/0067214 | A1 | * | 3/2005 | Tanaka et al. | 180/446 |
| 2005/0146128 | A1 | * | 7/2005 | Midorikawa et al. | 280/807 |
| 2005/0230180 | A1 | * | 10/2005 | Kodama | 180/446 |
| 2006/0012323 | A1 | * | 1/2006 | Endo et al. | 318/432 |
| 2006/0022469 | A1 | * | 2/2006 | Syed et al. | 290/4 C |

(Continued)

FOREIGN PATENT DOCUMENTS

EP 1 480 324 A2 11/2004

(Continued)

*Primary Examiner* — Mark Hellner
*Assistant Examiner* — Helal A Algahaim
(74) *Attorney, Agent, or Firm* — Rabin & Berdo, PC

(57) ABSTRACT

A transmission includes a gear ratio change mechanism, a driving circuit and an electronic control unit (ECU). The gear ratio change mechanism has a motor for continuously varying the gear ratio. The driving circuit applies a pulse voltage to the motor. The ECU outputs a control signal to the driving circuit. The duty ratio and/or the pulse height of the pulse voltage is changed according to the control signal. The ECU performs a low-pass filtering process on the control signal to output the low-pass filtered control signal to the driving circuit. Gear ratio change shocks are thereby suppressed.

20 Claims, 9 Drawing Sheets

U.S. PATENT DOCUMENTS

| | | | | |
|---|---|---|---|---|
| 2006/0076913 A1* | 4/2006 | Rodrian | | 318/272 |
| 2006/0085111 A1* | 4/2006 | Kojima | | 701/38 |
| 2006/0125439 A1* | 6/2006 | Ajima et al. | | 318/716 |
| 2006/0142117 A1* | 6/2006 | Colvin et al. | | 477/107 |
| 2006/0238907 A1* | 10/2006 | Onuki et al. | | 359/877 |
| 2007/0080538 A1* | 4/2007 | Syed et al. | | 290/4 C |
| 2007/0205041 A1* | 9/2007 | Nishizaki et al. | | 180/446 |
| 2008/0116898 A1* | 5/2008 | Washington | | 324/521 |
| 2010/0045219 A1* | 2/2010 | Ajima et al. | | 318/400.04 |

FOREIGN PATENT DOCUMENTS

JP      2004-019740      1/2004

* cited by examiner

TRANSMISSION, VEHICLE HAVING THE TRANSMISSION, AND CONTROL DEVICE AND CONTROL METHOD FOR THE TRANSMISSION

RELATED APPLICATIONS

This application claims the benefit of priority under 35 USC 119 of Japanese patent application no. 2007-021241, filed on Jan. 31, 2007, which application is hereby incorporated by reference in its entirety.

BACKGROUND OF THE INVENTION

1. Field of the Invention

The present invention relates to a transmission for a vehicle, and a control device and method for the transmission.

2. Description of Related Art

A conventional electronically controlled continuously variable transmission (ECVT) adjusts a gear ratio irrespective of engine speed (see, for example, JP-A-2004-19740). Therefore, ECVTs are widely used in vehicles such as scooters.

An ECVT includes a gear ratio change motor for changing the gear ratio between input and output shafts. In general, the gear ratio change motor is driven by applying a pulse voltage with a view to reducing power loss.

Vehicles having a conventional ECVT, however, may give gear ratio change shocks at gear ratio changes and thus provide poor drivability. For example, where a driving source unit including the ECVT is directly attached to a vehicle body frame so as to be pivotable, gear ratio change shocks are particularly easily transmitted to the rider, which further deteriorates drivability.

SUMMARY OF THE INVENTION

The present invention addresses the foregoing problem and improves drivability of a vehicle having an ECVT by suppressing gear ratio change shocks.

A transmission in accordance with the present invention includes a gear ratio change mechanism, a motor driving section and a control section. The gear ratio change mechanism has a motor that continuously varies a gear ratio between input and output shafts. The motor driving section applies a pulse voltage to the motor. The control section outputs a control signal to the motor driving section. At least one of the duty ratio and the pulse height of the pulse voltage is changed according to the control signal. The control section outputs to the motor driving section a low-pass filtered control signal after applying a low-pass filtering process to the control signal.

A vehicle in accordance with the present invention includes the gear ratio change mechanism described above.

A control device in accordance with the present invention controls a gear ratio change mechanism having a motor for continuously varying a gear ratio between input and output shafts. The control device includes a motor driving section that applies a pulse voltage to the motor and a control section that outputs a control signal to the motor driving section. At least one of the duty ratio and the pulse height of the pulse voltage is changed according to the control signal. The control section outputs to the motor driving section a low-pass filtered control signal after applying a low-pass filtering process to the control signal.

A control method in accordance with the present invention controls a gear ratio change mechanism having a motor for continuously varying a gear ratio between input and output shafts. The control method includes applying a low-pass filtering process to a control signal for changing at least one of the duty ratio and the pulse height of a pulse voltage; and applying to the motor the pulse voltage controlled by a low-pass filtered control signal to drive the motor.

The present invention improves drivability by suppressing gear ratio change shocks.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiment 1

Summary of the Embodiment

A two wheeled motorized vehicle 1 according to an embodiment of the invention is described with reference to FIG. 1. Although a scooter type vehicle is described, the invention is not limited to a scooter type vehicle and may be, for example, a non-scooter type vehicle such as an off-road type, motorcycle type, scooter type or moped type vehicle. In addition, the vehicle may be a straddle type vehicle other than a two wheeled motorized vehicle such as an all terrain vehicle (ATV) or the like. Further, the vehicle may be a vehicle other than a straddle type vehicle such as a four-wheeled vehicle.

<Detailed Description of Vehicle 1>

Figure 1:
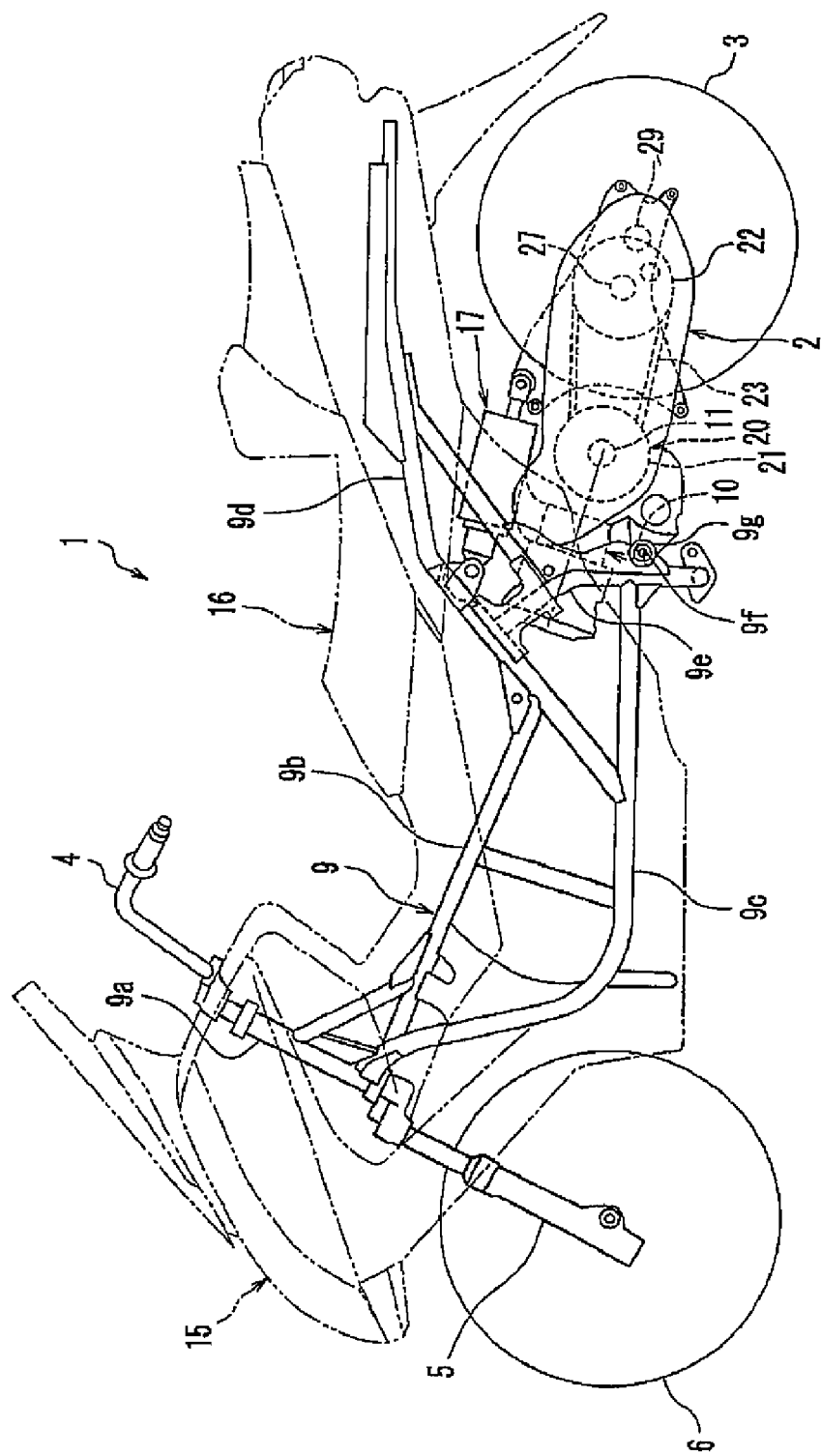
FIG. 1 is a side view of a two wheeled motorized vehicle to which the present invention is applied.

FIG. 1 is a side view of vehicle 1. Vehicle 1 includes a body frame 9, an engine unit 2 as a driving source unit, a rear wheel 3 and a front wheel 6.

(Construction of Body Frame 9)

Body frame 9 includes a head pipe 9a disposed at a front end, an upper tube 9b, a down tube 9c, a seat rail 9d and a vertical frame member 9e. Steering handlebars 4 are attached to an upper end of head pipe 9a. A front fork 5 is connected to a lower end of head pipe 9a. A front wheel 6 is rotatably attached to a distal end of front fork 5. Front wheel 6 is not connected to engine unit 2. In other words, front wheel 6 is a driven wheel.

Down tube 9c extends obliquely rearward and downward from head pipe 9a. Down tube 9c is bent at its intermediate portion to extend rearward and generally horizontally therefrom. Upper tube 9b extends obliquely rearward and downward above down tube 9c from a connection between head pipe 9a and down tube 9c. Seat rail 9d extends obliquely rearward and upward from a connection to the generally horizontal portion of down tube 9c. A lower end of upper tube 9d is connected to seat rail 9d. An intermediate portion of seat rail 9d is coupled via vertical frame member 9e to a rear end of down tube 9c.

A body cover 15 covers body frame 9. A seat 16 is attached to body cover 15.

(Relationship Between Body Frame 9 and Engine Unit 2)

Figure 2:
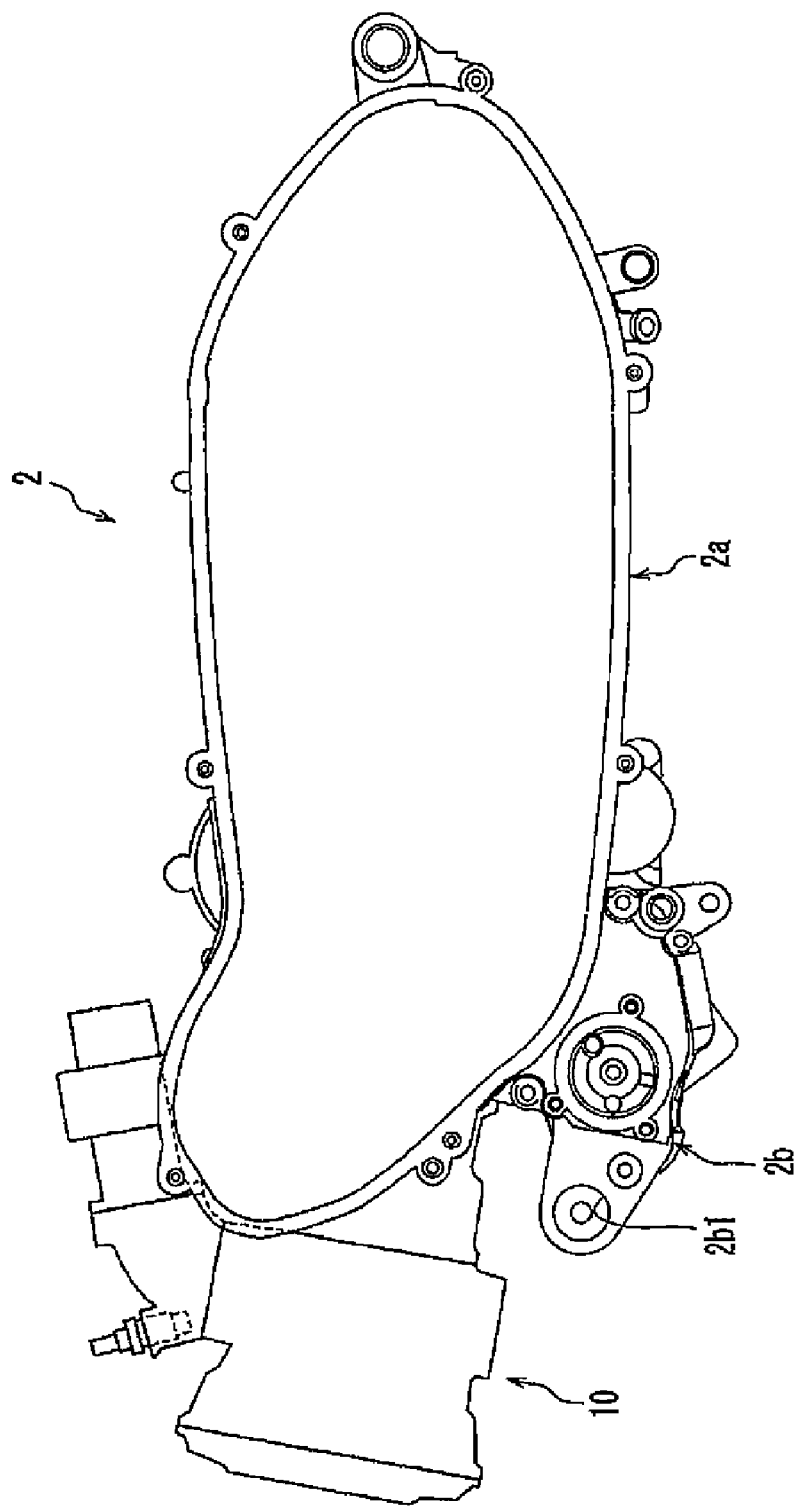
FIG. 2 is a partial side cross sectional view of an engine unit of the vehicle.

Engine unit 2 is directly and pivotably attached to body frame 9. As shown in FIG. 1, a pivot member 9f attached to vertical frame member 9e is formed in the shape of a cylinder extending in the vehicle width direction. A pivot shaft 9g extending in the vehicle width direction is attached to pivot member 9f. As shown in FIG. 2, a pivot part 2b formed at a front and lower portion of a housing 2a of engine unit 2 is formed with a through hole 2b1 having generally the same inner diameter as that of pivot member 9f. Pivot shaft 9g is rotatably inserted into through hole 2b1.

As shown in FIG. 1, engine unit 2 is connected to an intermediate portion of seat rail 9d via a rear cushion unit 17. Rear cushion unit 17 suppresses oscillations of engine unit 2.

(Construction of Engine Unit 2)

The construction of engine unit 2 is now described with reference to FIG. 3.

—Construction of Engine 10—

Figure 3:
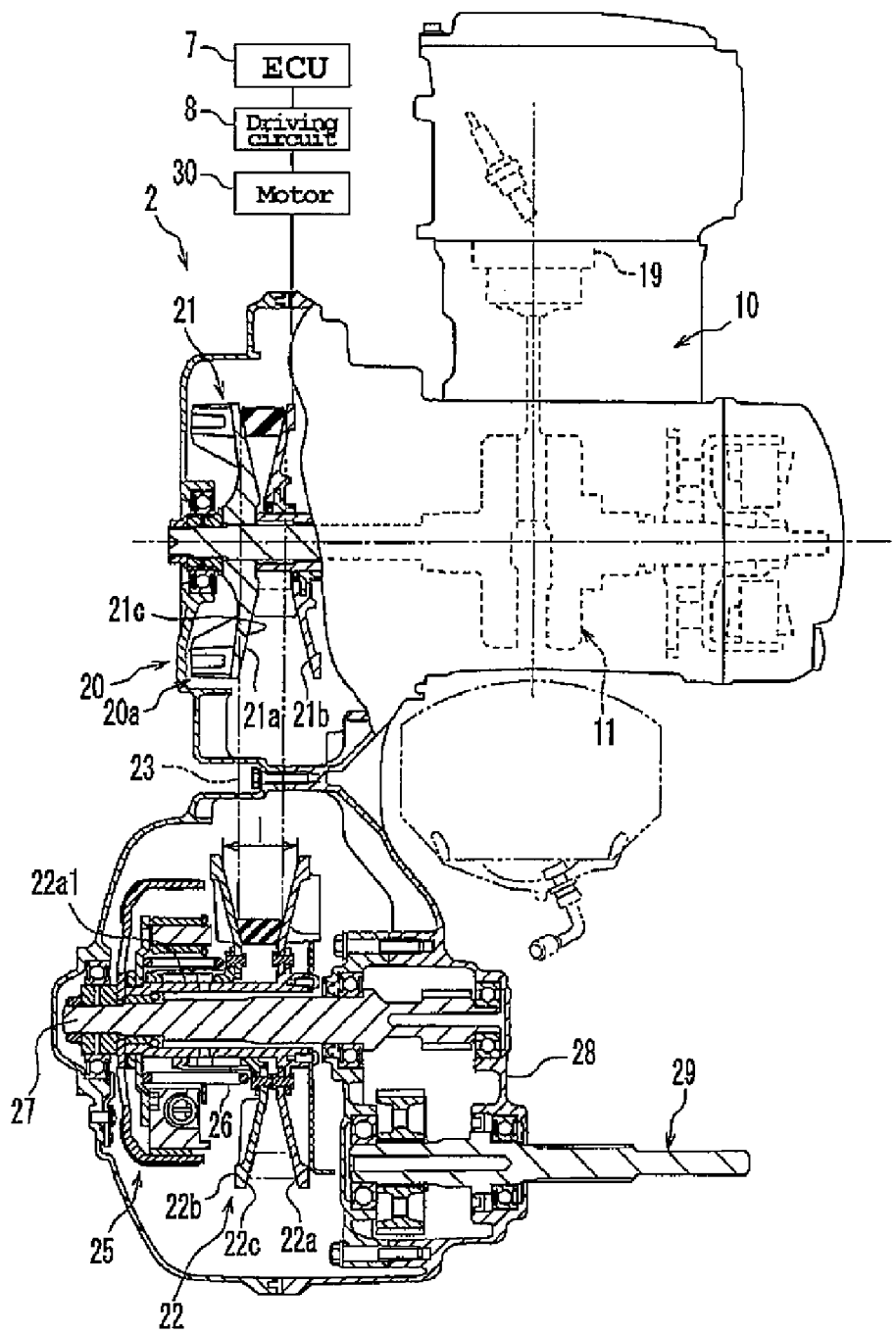
FIG. 3 is a partial cross sectional view of the engine unit.

As shown in FIG. 3, engine unit 2 includes an engine 10 and a transmission 20. Engine 10 is described as a 4-cycle forced-air-cooled engine, however, engine 10 may be another type of engine such as, for example, a water-cooled engine or a 2-cycle engine. A driving source other than an engine such as an electric motor may be provided in place of engine 10. Thus, the driving source of the present invention is not limited to specific types. As shown in FIG. 3, engine 10 includes a crankshaft 11 coupled to a piston 19.

—Construction of Transmission 20—

Transmission 20 comprises a gear ratio change mechanism 20a, an electronic control unit (ECU) 7 as a control section and a driving circuit 8 as a motor driving section. Gear ratio change mechanism 20a is described a belt type ECVT, however, it is not limited to a belt type ECVT and may be, for example, a toroidal type ECVT.

Gear ratio change mechanism 20a includes a V-belt 23 is wound around a primary sheave 21 and a secondary sheave 22. V-belt 23 has a generally V-shaped cross section.

Primary sheave 21 rotates together with crankshaft 11 as an input shaft. Primary sheave 21 includes a fixed sheave half 21a fixed to one end of crankshaft 11 and a movable sheave half 21b opposing fixed sheave half 21a and movable in the axial direction of crankshaft 11. Opposing surfaces of fixed sheave half 21a and movable sheave half 21b form a belt groove 21c for receiving V-belt 23. Belt groove 21c is wider toward the radially outer side of primary sheave 21.

The width of belt groove 21c is changed as a motor 30 drives movable sheave half 21b in the axial direction of crankshaft 11. In this embodiment, motor 30 is driven by pulse width modulation (PWM).

Secondary sheave 22 is disposed at the rear of primary sheave 21 and is attached to a driven shaft 27 via a centrifugal clutch 25. Secondary sheave 22 includes a fixed sheave half 22a, which is provided with a cylindrical output shaft 22a1 that is formed integrally therewith, and a movable sheave half 22b that opposes fixed sheave half 22a and is movable in the axial direction of driven shaft 27. Opposing surfaces of fixed sheave half 22a and movable sheave half 22b form a belt groove 22c for receiving V-belt 23. Belt groove 22c is wider toward the radially outer side of secondary sheave 22.

Movable sheave half 22b is urged by a spring 26 in a direction of reducing the width of belt groove 22c. When motor 30 is driven to reduce the width of belt groove 21c and thus increase the winding diameter of V-belt 23 around primary sheave 21, V-belt 23 is pulled toward the radially inner side of secondary sheave 22. This causes movable sheave half 22b to move in the direction of increasing the width of belt groove 22c against the urging force of spring 26. This in turn reduces the winding diameter of V-belt 23 around secondary sheave 22. As a result, the gear ratio of gear ratio change mechanism 20a is changed.

Centrifugal clutch 25 is engaged and disengaged according to the rotational speed of fixed sheave half 22a. Specifically, when the rotational speed of fixed sheave half 22a is less than a predetermined rotational speed, centrifugal clutch 25 is not engaged and rotation of fixed sheave half 22a is not transmitted to driven shaft 27. On the other hand, when the rotational speed of fixed sheave half 22a is equal to or more than the predetermined rotational speed, centrifugal clutch 25 is engaged and rotation of fixed sheave half 22a is transmitted to driven shaft 27.

Driven shaft 27 is coupled to an axle 29 via speed reduction mechanism 28. As shown in FIG. 1, rear wheel 3 is attached to axle 29 for rotation. Therefore, as driven shaft 27 rotates, axle 29 and rear wheel 3 rotate together.

<Control System of Vehicle 1>

A control system of vehicle 1 is now described with reference to FIG. 4.

—Outline of Control System of Vehicle 1—

Figure 4:
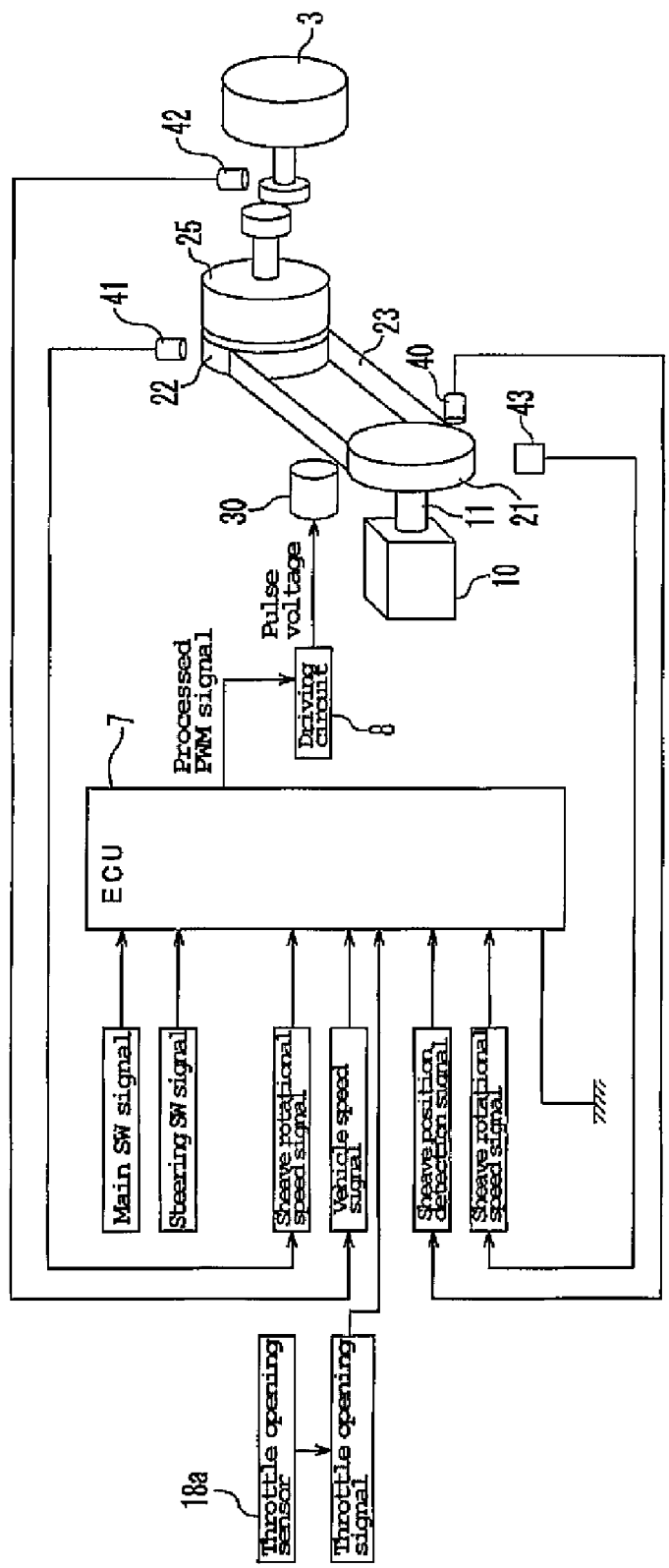
FIG. 4 is a block diagram illustrating a control system of the vehicle.

As shown in FIG. 4, a sheave position sensor 40 connected to ECU 7 detects the position of movable sheave half 21b of primary sheave 21 relative to fixed sheave half 21a (hereinafter referred to as "sheave position"). In other words, sheave position sensor 40 detects the distance (l) between fixed sheave half 21a and movable sheave half 21b in the axial direction of crankshaft 11 and outputs to ECU 7 the detected distance (l) as a sheave position detection signal. Sheave position sensor 40 may be, for example, a potentiometer or the like.

A primary sheave rotational speed sensor 43, a secondary sheave rotational speed sensor 41 and a vehicle speed sensor 42 are connected to ECU 7. Primary sheave rotational speed sensor 43 detects the rotational speed of primary sheave 21 and outputs to ECU 7 the detected rotational speed of primary sheave 21 as a sheave rotational speed signal. Secondary sheave rotational speed sensor 41 detects the rotational speed of secondary sheave 22 and outputs to ECU 7 the detected rotational speed of secondary sheave 22 as a sheave rotational speed signal. Vehicle speed sensor 42 detects the rotational speed of rear wheel 3 and outputs to ECU 7 a vehicle speed signal based on the detected rotational speed.

A steering switch attached to steering handlebars 4 (FIG. 1) is connected to ECU 7 and outputs a steering SW signal when operated by the rider. A throttle opening sensor 18a outputs a throttle opening signal to ECU 7.

—Control of Gear Ratio Change Mechanism 20a—

ECU 7 performs feedback control of the position of movable sheave half 21b of primary sheave 21 based on the vehicle speed signal and so forth. In other words, ECU 7 performs feedback control of the distance (l) based on the vehicle speed signal and so forth.

Figure 5:
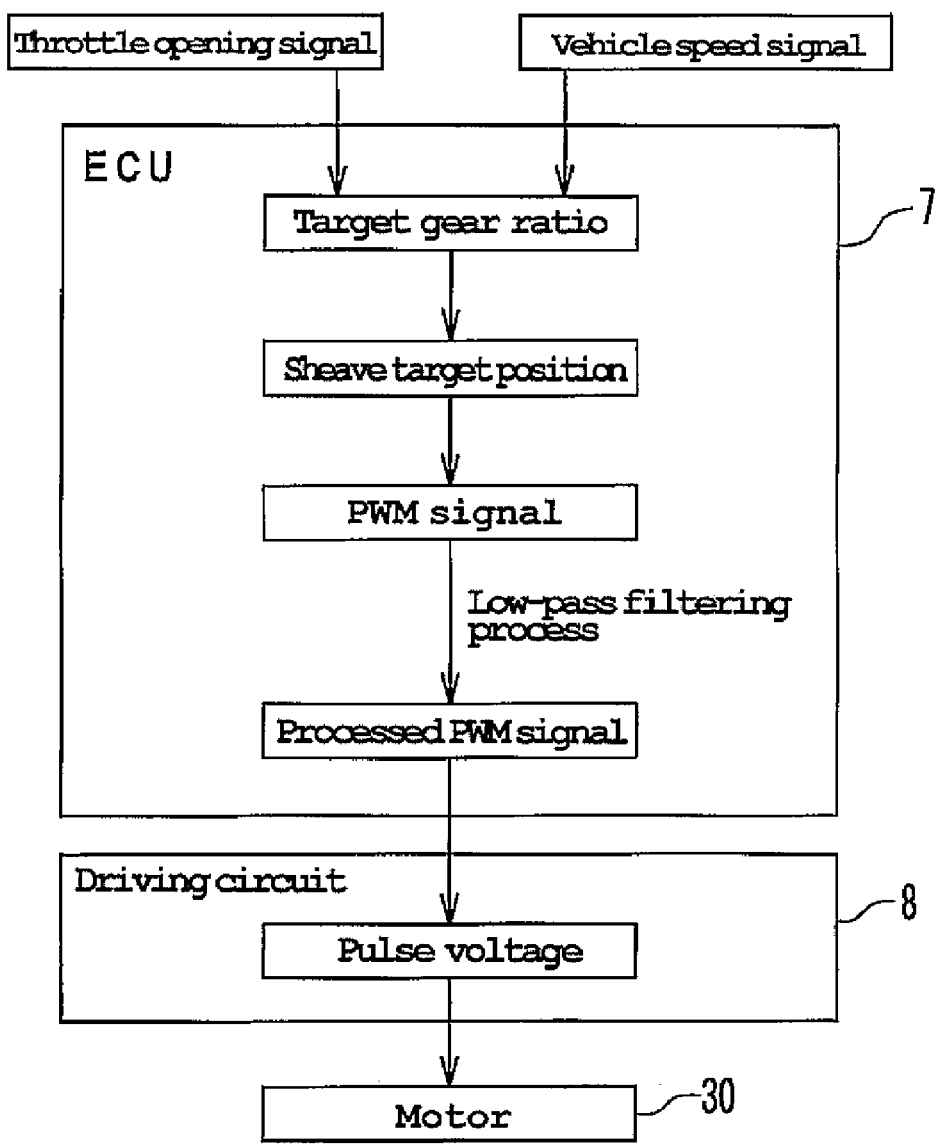
FIG. 5 is a block diagram illustrating sheave position control.

Specifically, as shown in FIG. 5, ECU 7 determines a target gear ratio based on the throttle opening and vehicle speed and then calculates a sheave target position based on the determined target gear ratio. In other words, ECU 7 calculates a target distance l between movable sheave half 21b and fixed sheave half 21a based on the determined target gear ratio. In order to displace movable sheave half 21b to the sheave target position, ECU 7 always applies a low-pass filtering process to a pulse width modulation (PWM) signal in accordance with the current position of movable sheave half 21b and the sheave target position, before outputting the signal to driving circuit 8. As shown in FIG. 4, driving circuit 8 applies to motor 30 a pulse voltage in accordance with the pulse width modulation signal. This drives movable sheave half 21b to adjust the gear ratio.

Figure 6:
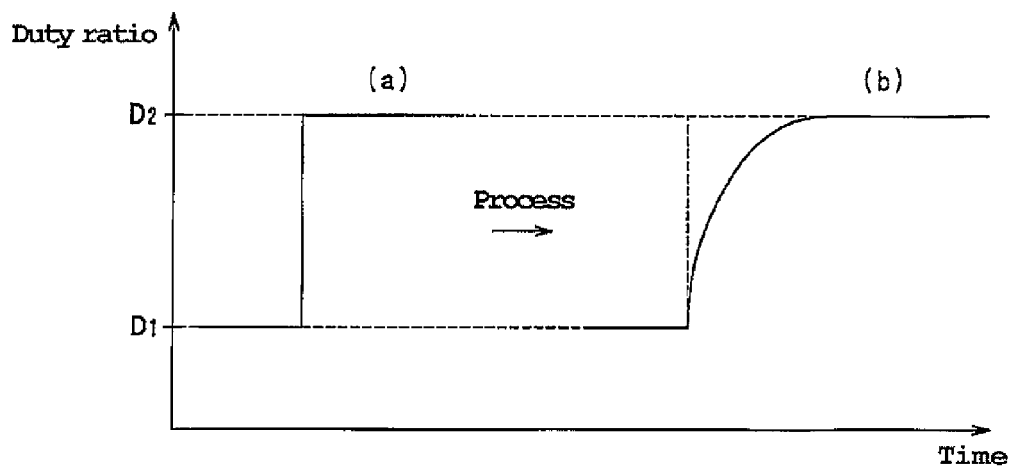
FIG. 6 is a graph showing changes in a duty ratio of a pulse voltage to be applied to a motor without and with a low-pass filtering process applied to a PWM signal.
Figure 7:
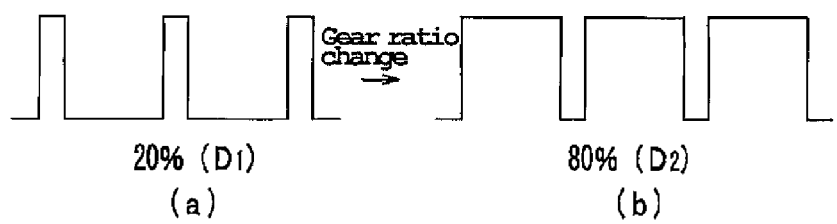
FIG. 7 is a schematic diagram showing changes in a waveform of the pulse voltage where the PWM signal before the low-pass filtering process is directly output to a driving circuit.

Applying a low-pass filtering process to a PWM signal means gradually changing the PWM signal, that is, moderating changes in the PWM signal. This allows the duty ratio of the pulse voltage applied to motor 30 to change gradually rather than abruptly.

Where the PWM signal before the low-pass filtering process is directly output to driving circuit 8, the duty ratio changes abruptly from the current value $D_1$ to $D_2$ as shown in (a) of FIG. 6, for example. As shown in FIG. 7, the duty ratio changes abruptly, for example, from 20% (a) to 80% (b).

Figure 8:
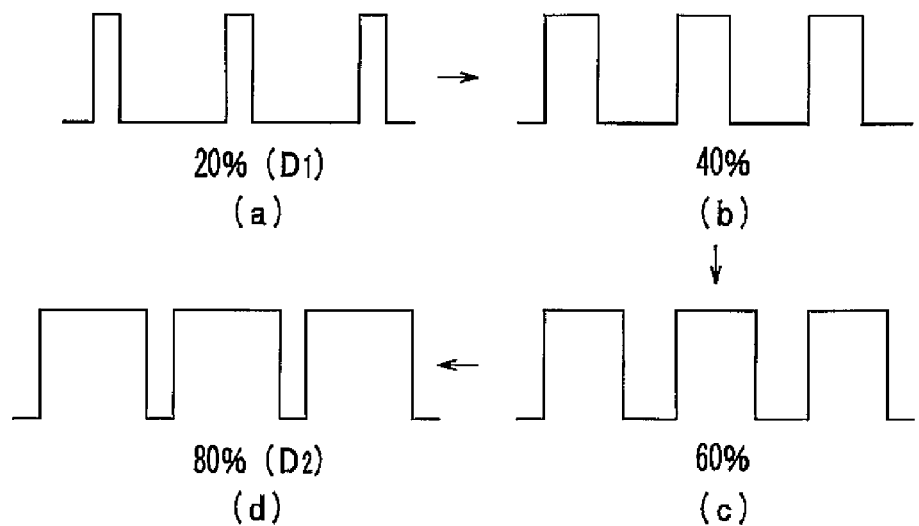
FIG. 8 is a schematic diagram showing changes in the waveform of the pulse voltage where the PWM signal after the low-pass filtering process is output to the driving circuit.

In contrast, the low-pass filtering process produces a signal with a duty ratio that changes moderately from $D_1$ to $D_2$. Where the PWM signal after the low-pass filtering process is output to driving circuit 8, the duty ratio changes moderately from $D_1$ to $D_2$ as shown in (b) of FIG. 6. As shown in FIG. 8, the duty ratio changes moderately, for example, from 20% (a), to 40% (b), to 60% (c) and finally to 80% (d). Therefore, the magnitude of the effective voltage applied to motor 30 also changes moderately.

[Function and Effect]

In this embodiment, as described above, a control (PWM) signal after being subjected to a low-pass filtering process in ECU 7 is output to driving circuit 8 as the motor driving section. Then, a pulse voltage in accordance with the low-pass filtered control signal is applied to motor 30. Thus, the duty ratio of the pulse voltage applied to motor 30 changes moderately as shown in (b) of FIG. 6. As a result, the effective voltage applied to motor 30 changes moderately. Hence, the torque of motor 30 changes moderately rather than abruptly. Thus, gear ratio change shocks in vehicle 1 at gear ratio changes achieved by motor 30 are suppressed and drivability of vehicle 1 is improved. To suppress gear ratio change shocks in vehicle 1, the PWM signal output to driving circuit 8 is preferably always low-pass filtered.

To further suppress gear ratio change shocks, changes in the effective voltage applied to motor 30 are preferably made more moderate. Therefore, the cutoff frequency of the low-pass filtering process performed on the PWM signal is preferably relatively low. A relatively low cutoff frequency, however, reduces the tracking speed of motor 30 when the target gear ratio is changed. As a result, the operation speed of vehicle 1 is reduced. Therefore, the cutoff frequency for a vehicle that requires swift operation is preferably relatively high. Thus, a relatively low cutoff frequency should be set for vehicles that do not require very swift operation but require that gear ratio change shocks be particularly small, while a relatively high cutoff frequency should be set for vehicles that require swift operation rather than suppression of gear ratio change shocks. The cutoff frequency is thereby set as appropriate according to the type of vehicle.

For example, in a vehicle in which engine unit 2 and body frame 9 are coupled via one or a plurality of link mechanisms that are pivotable relative to body frame 9, fluctuations in torque generated at rear wheel 3 are not directly transmitted to body frame 9, and body frame 9 thus does not receive very large gear ratio change shocks even at abrupt changes in the gear ratio. Therefore, there is less need to suppress abrupt changes in the effective voltage applied to motor 30.

In contrast, in vehicle 1 of this embodiment in which engine unit 2 is directly and pivotably attached to body frame 9, vibrations and oscillations in the front-and-rear direction applied to engine unit 2 are directly transmitted to body frame 9. Hence, fluctuations in the torque generated at rear wheel 3 are easily transmitted to body frame 9. This permits gear ratio change shocks to be easily transmitted to body frame 9 while allowing swift operation. Therefore, there is a strong need to suppress abrupt changes in the effective voltage applied to motor 30 for a vehicle in which the engine is directly and pivotably attached to the body frame 9, as in this embodiment. Thus, it is particularly effective to suppress abrupt changes in the effective voltage applied to motor 30 as in this embodiment. In addition, in this embodiment, the cutoff frequency of the low-pass filtering process is preferably relatively low.

In addition, suppressing abrupt changes in the effective voltage applied to motor 30 by applying the low-pass filtering process to the PWM signal can reduce the inrush current into motor 30.

Figure 9:
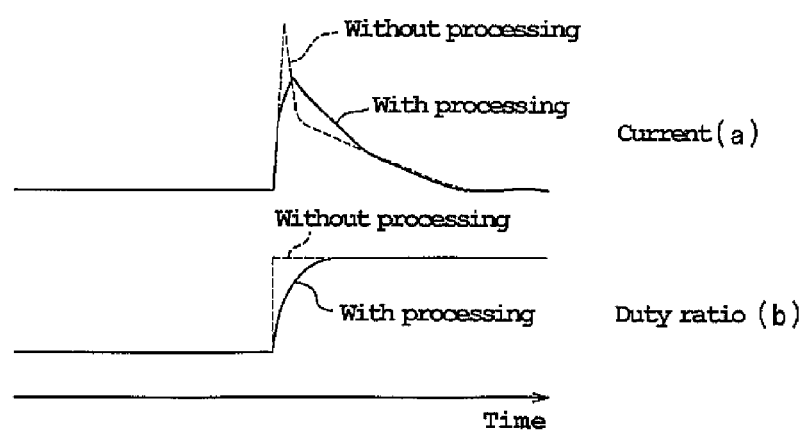
FIG. 9 is a schematic diagram showing the relationship between the duty ratio of the pulse voltage to be applied to the motor and the current that passes through the motor.
Figure 10:
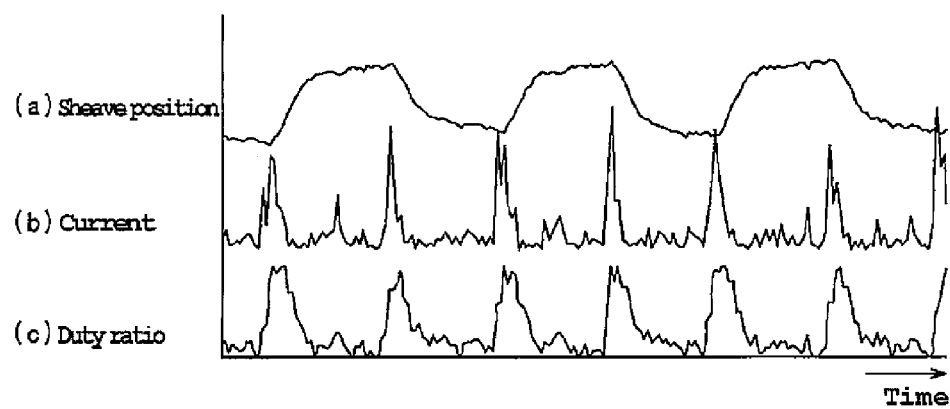
FIG. 10 is a graph showing sheave position, current that passes through the motor and the duty ratio of the pulse voltage to be applied to the motor where the low-pass filtering process is not applied to the PWM signal.

The number of times motor 30 for changing the gear ratio is driven in reverse and the number of times motor 30 is activated are very large compared to motors for normal use. Therefore, an inrush current frequently occurs at activation and reverse driving of motor 30. As a result, a large burden is placed on motor 30 and driving circuit 8 therefore reduces the durability of motor 30 and driving circuit 8.

Where the low-pass filtering process is not applied to the PWM signal, the duty ratio of the pulse voltage applied to motor 30 changes abruptly as indicated by the dotted line in FIG. 9. As a result, the effective voltage applied to motor 30 also changes abruptly. Therefore, a large inrush current is generated when the duty ratio of the pulse voltage applied to motor 30 changes abruptly as indicated by the dotted line in (a) of FIG. 9. Thus, a large inrush current occurs when the position of movable sheave half 21b changes as shown in (b) of FIG. 10, placing a load on motor 30 and driving circuit 8.

Figure 11:
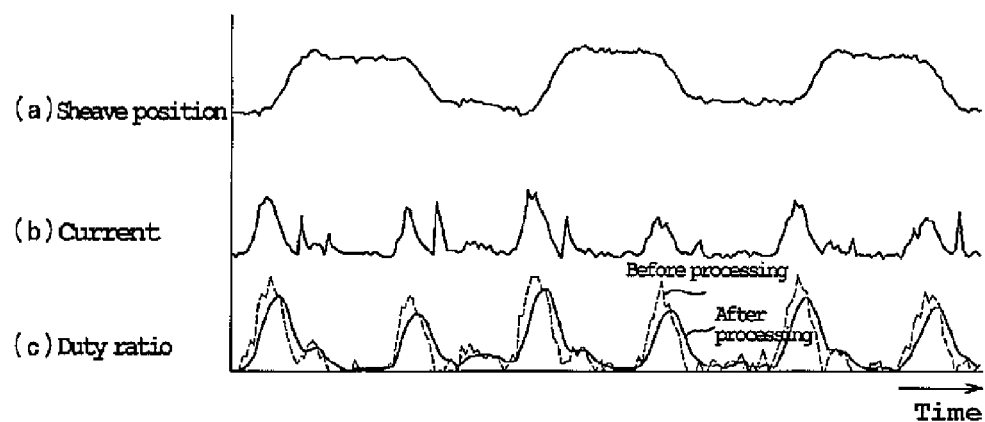
FIG. 11 is a graph showing sheave position, current that passes through the motor and the duty ratio of the pulse voltage to be applied to the motor where the low-pass filtering process is applied to the PWM signal.

In contrast, applying the low-pass filtering process to the PWM signal suppresses abrupt changes in the effective voltage applied to motor 30 as indicated by the solid line in (b) of FIG. 9. As a result, an increase in the current that flows into motor 30 is suppressed as indicated by the solid line in (a) of FIG. 9. In other words, an inrush current that flows into motor 30 is made smaller. Thus, an inrush current that occurs when the position of movable sheave half 21b changes is suppressed as shown in (b) of FIG. 11, reducing the load on and extending the service life of motor 30 and driving circuit 8.

In this embodiment, motor 30 is controlled by PWM. Therefore, power loss is reduced and high energy efficiency is achieved, with simple circuitry.

<<Modification 1>>

Figure 12:
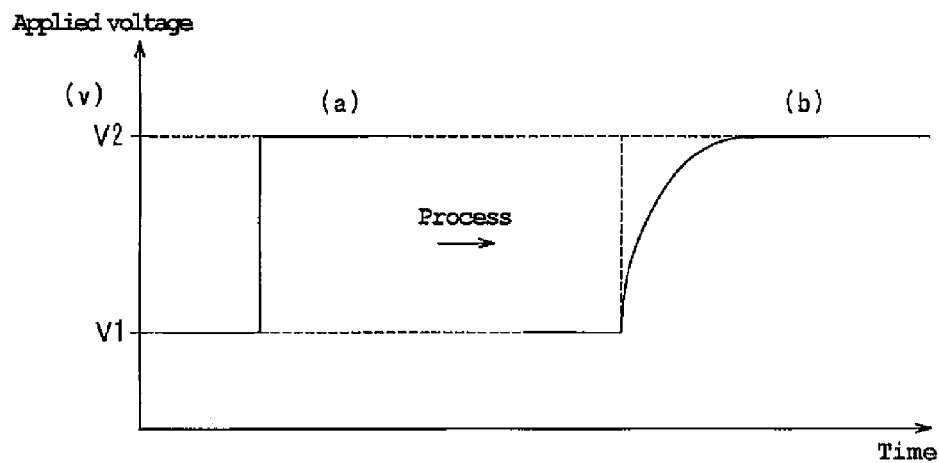
FIG. 12 shows changes in the pulse height of the pulse voltage to be applied to the motor without and with the low-pass filtering process applied to the PWM signal.
Figure 13:
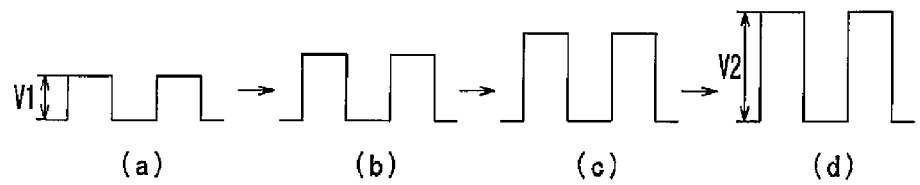
FIG. 13 is a schematic diagram showing changes in the waveform of the pulse voltage in the case where a PAM signal after the low-pass filtering process is output to the driving circuit.

In the above embodiment, the duty ratio of the pulse voltage applied to motor 30 is changed according to the control signal. However, the pulse height of the pulse voltage applied to motor 30 (applied voltage) may be changed according to the control signal. In other words, motor 30 may be controlled by pulse amplitude modulation (PAM). In this case, a PAM signal for changing the pulse height of the pulse voltage applied to motor 30 is output as a control signal from ECU 7 to driving circuit 8 after being subjected to a low-pass filtering process. Therefore, the pulse height of the pulse voltage applied to motor 30 changes moderately as shown in FIGS. 12 and 13. As a result, the effective voltage applied to motor 30 also changes moderately with gear ratio change shocks suppressed. Hence, drivability is improved and less inrush current flows into motor 30 and driving circuit 8, as in the above embodiment.

<<Other Modifications>>

Although a scooter type vehicle has been described, the invention is not limited to a scooter type vehicle and may be a non-scooter type vehicle such as an off-road type, motorcycle type, scooter type, or moped type vehicle. In addition, the vehicle may be a straddle type vehicle other than a two wheeled motorized vehicle such as an all terrain vehicle (ATV) or the like. Further, the vehicle may be a vehicle other than a straddle type vehicle such as a four-wheeled vehicle.

It should be noted, however, that the present invention is especially effective for two wheeled motorized vehicles. In relatively heavyweight vehicles such as four-wheeled vehicles, gear ratio change shocks are not easily transmitted to the rider and therefore are not a relatively significant problem. In contrast, in two wheeled motorized vehicles, which are relatively lightweight, gear ratio change shocks are easily transmitted to the rider and are a relatively significant problem.

Gear ratio change mechanism 20a is not limited to a belt type ECVT. Gear ratio change mechanism 20a may be, for example, a toroidal type ECVT.

In the above embodiment, a low-pass filtering process is applied to the control signal by software processing in ECU 7. In the present invention, however, the low-pass filtering process may be applied to the control signal by a low-pass filtering circuit disposed between ECU 7 and driving circuit 8.

A relatively low cutoff frequency is preferably set for vehicles that do not require very swift operation but require that gear ratio change shocks in the vehicle be particularly small. On the other hand, a relatively high cutoff frequency is preferably set for vehicles that require swift operation rather than suppression of gear ratio change shocks. That is, the cutoff frequency should be set as appropriate according to the type of the vehicle.

In the above embodiment, the low-pass filtering process is always applied to the control signal. However, the present invention is not limited to such a configuration. For example, the low-pass filtering process may be performed on the control signal only when the gear ratio is changed relatively significantly. Alternatively, the rider may be allowed to select between an ON mode where the low-pass filtering process is applied to the control signal and an OFF mode where the low-pass filtering process is not applied to the control signal. A selection switch for selecting between ON and OFF modes may be provided so that the low-pass filtering process is applied to the control signal only when the ON mode is selected.

In the above embodiment and Modification 1, only one of the duty ratio and the pulse height of the pulse voltage applied to motor 30 is changed according to the control signal. However, both the duty ratio and the pulse height of the pulse voltage applied to motor 30 may be changed according to the control signal.

<<Definitions of Terms in the Specification>>

The term "driving source" refers to a device that generates power. The "driving source" may be, for example, an internal combustion engine, an electric motor or the like.

The term "pulse height of pulse voltage" refers to the magnitude of the pulse voltage actually applied to motor 30. That is, the term "effective voltage" refers to a value obtained by multiplying the magnitude of the pulse voltage by the duty ratio.

The present invention is effectively applicable to ECVTs.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A transmission comprising:
   a gear ratio change mechanism having a motor for continuously varying a gear ratio between an input shaft and an output shaft;
   a motor driving section for applying a pulse voltage to the motor; and
   a control section for outputting to the motor driving section an output control signal for changing at least one of a duty ratio and a pulse height of the pulse voltage,
   wherein the control section outputs to the motor driving section as the output control signal a low-pass filtered control signal after applying a low-pass filtering process to another control signal.

2. The transmission according to claim 1, wherein the control section always applies the low-pass filtering process to the another control signal.

3. The transmission according to claim 1, wherein the control section selectively applies the low-pass filtering process to the another control signal.

4. The transmission according to claim 3, wherein the control section applies the low-pass filtering process to the another control signal only when the gear ratio is changed significantly.

5. The transmission according to claim 3, wherein the control section applies the low-pass filtering process to the another control signal only upon selection of a mode to apply the low-pass filtering process.

6. The transmission according to claim 1, wherein the another control signal is a pulse width modulation control signal for controlling the duty ratio of the pulse voltage.

7. The transmission according to claim 1, wherein the another control signal is a pulse amplitude modulation control signal for controlling the pulse height of the pulse voltage.

8. The transmission according to claim 1, wherein the low pass filtering process has a relatively low cut off frequency.

9. A vehicle comprising the transmission according to claim 1.

10. The vehicle according to claim 9, further comprising:
    a driving source connected to the input shaft to form a driving source unit in conjunction with the transmission; and
    a body frame, wherein the driving source unit is directly and pivotably attached to the body frame.

11. A two wheeled motorized vehicle comprising the transmission according to claim 1.

12. A control device for a gear ratio change mechanism having a motor for continuously varying a gear ratio between an input shaft and an output shaft, the control device comprising:
- a motor driving section for applying a pulse voltage to the motor to continuously vary the gear ratio between the input shaft and the output shaft; and
- a control section for outputting to the motor driving section an output control signal for changing at least one of a duty ratio and a pulse height of the pulse voltage,
- wherein the control section outputs to the motor driving section as the output control signal a low-pass filtered control signal after applying a low-pass filtering process to another control signal.

13. A control method for a gear ratio change mechanism having a motor for continuously varying a gear ratio between an input shaft and an output shaft, the control method comprising:
- applying a low-pass filtering process to a control signal for changing at least one of a duty ratio and a pulse height of a pulse voltage to continuously vary the gear ratio between the input shaft and the output shaft; and
- applying to the motor the pulse voltage controlled by the low-pass filtered control signal to drive the motor.

14. The control method according to claim 13, wherein the low-pass filtering process is always applied to the control signal.

15. The control method according to claim 13, wherein the low-pass filtering process is selectively applied to the control signal.

16. The control method according to claim 15, wherein the low-pass filtering process is applied to the control signal only when the gear ratio is changed significantly.

17. The control method according to claim 15, wherein the low-pass filtering process is applied to the control signal only when a mode is selected to apply the low-pass filtering process.

18. The control method according to claim 13, wherein the another control signal is a pulse width modulation control signal that is applied to control the duty ratio of the pulse voltage.

19. The control method according to claim 13, wherein the another control signal is a pulse amplitude modulation control signal that is applied to control the pulse height of the pulse voltage.

20. The control method according to claim 13, wherein the low pass filtering process has a relatively low cut off frequency.

* * * * *